United States Patent [19]

Roger

[11] 4,107,584
[45] Aug. 15, 1978

[54] CURRENT LIMITING DEVICE FOR AN A.C. MOTOR

[75] Inventor: Jean Roger, Conflans Ste Honorine, France

[73] Assignee: Aciers et Outillage Peugeot, Audincourt, France

[21] Appl. No.: 797,960

[22] Filed: May 18, 1977

[30] Foreign Application Priority Data

May 18, 1976 [FR] France .................... 76 14943

[51] Int. Cl.² ............................................ H02P 5/40
[52] U.S. Cl. .................................. 318/227; 318/230; 318/245
[58] Field of Search .......... 318/227, 230, 245, 345 R, 318/345 C, 345 D

[56] References Cited

U.S. PATENT DOCUMENTS

| | | | |
|---|---|---|---|
| 3,271,648 | 9/1966 | Weed | 318/227 UX |
| 3,366,861 | 1/1968 | Dudler | 318/227 |
| 3,443,188 | 5/1969 | Mortimer | 318/227 UX |
| 3,447,057 | 5/1969 | Brown et al. | 318/227 UX |
| 3,470,436 | 9/1969 | Steele | 318/227 |
| 3,596,158 | 7/1971 | Watrous | 318/227 |
| 3,875,485 | 4/1975 | Hornung | 318/227 |

*Primary Examiner*—Gene Z. Rubinson
*Attorney, Agent, or Firm*—Sughrue, Rothwell, Mion, Zinn and Macpeak

[57] ABSTRACT

A device for limiting the current in an a.c.motor having a commutator adapted to be supplied with current by a single-phase current source. The device comprising a triggerable silicon-controlled rectifier component connected in series with the motor and in parallel with an RC phase-shifting circuit furnishing the control voltage of the rectifier component. The capacitive branch of the RC circuit is connected in parallel with a shunt circuit which shunts a certain quantity of the charging current of the branch for modifying the trigger instants of the rectifier component. The shunt circuit comprises two transistors of opposed conductivity types which are connected with a common emitter configuration, the collector-emitter circuits of the transistors being connected in parallel with the capacitive branch. The limiting device further comprises a control circuit furnishing two d.c. control signals whose magnitudes are a function of the intensities of the two half-cycles of the current flowing in the rectifier component. The bases of the transistors are respectively subjected to the control signals so that the shunt circuit can shunt, beyond a predetermined current threshold of the current in the motor, a notable part of the two half-cycles of each period of the current.

5 Claims, 8 Drawing Figures

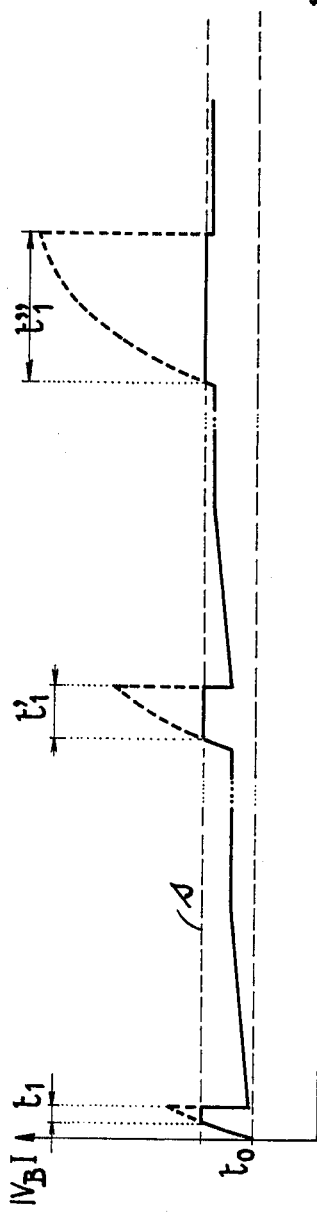
FIG._5
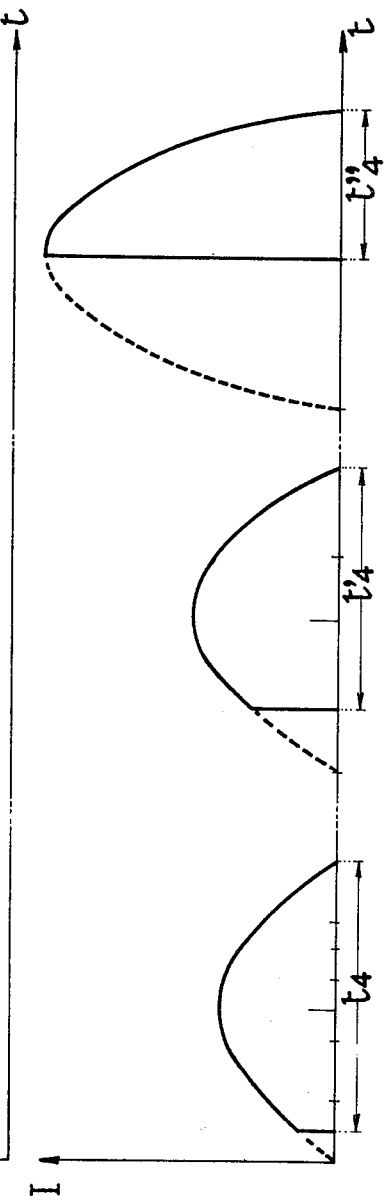
FIG._6
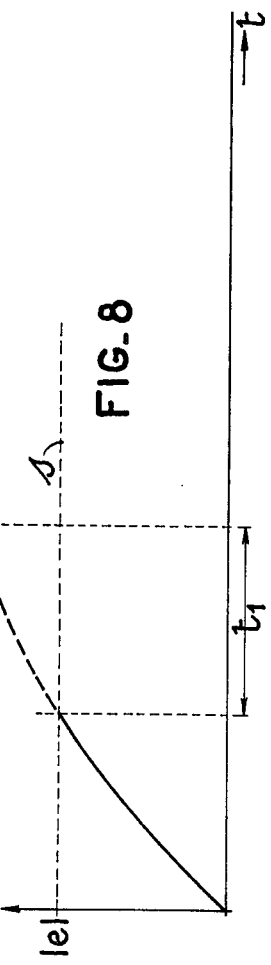
FIG._8
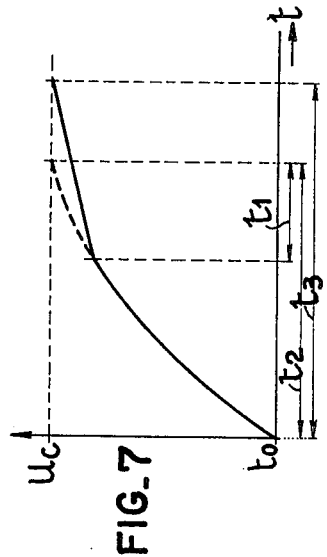
FIG._7

CURRENT LIMITING DEVICE FOR AN A.C. MOTOR

The present invention relates to the supply of current to electric motors from a source of a.c. current such as the mains, by means of a triggerable bidirectional semiconductor device or silicon controlled rectifier, by phase-shifting a control current with respect to the current flowing in the motor. More particularly, the invention concerns a device whereby it is possible to limit the current in an electric motor of the universal a.c. type having a commutator employed in particular in electric handtools.

It is known to employ for regulating the speed of this type of motor a supply device comprising one or more semi-conductor components such as triacs or thyristors which may be triggered at a predetermined instant in the course of each half-cycle of the supply voltage. For this purpose, these components comprise a trigger electrode to which there is applied a control voltage whose phase relative to the supply voltage may be regulated by means of an RC circuit connected to said trigger electrode.

It is also known to protect these universal motors against overloads which result in excessive current intensities, by means of thermal circuit-breakers which break the passage of the current in the motor in the event of prolonged overload. The major drawback of these circuit-breakers, apart from their doubtful precision, is the necessity to wait for the cooling of their heating element, which may last several minutes, for rearming. It is then impossible to rotate the motor in the no-load state to cool it by ventilation and this results in lost time in the work.

An object of the invention is to provide a current limiting device which does not have these drawbacks. More particularly, the object of the invention is to provide a device for protecting against overloads which operates automatically and is of small overall size and cheap so as to permit its incorporation in particular in handtools. The device according to the invention is precise and immediate in its action, and the cessation of the overload immediately results in a normal operation of the motor so that it can be cooled by ventilation without delay. This immediate action consequently enables this device to act advantageously at the moment of starting up the motor which is thus protected and thereby reduces mechanical shocks and demands on the supply source.

According to the invention, there is provided a device for limiting the current in an a.c. motor having a commutator intended to be supplied with current by a single-phase a.c. current source, of the type comprising a triggerable silicon-controlled rectifier component connected in series with said motor and in parallel with an RC phase-shifting circuit furnishing the control voltage of said rectifier component, the capacitive branch of said RC circuit being connected in parallel with a shunt circuit which shunts a certain quantity of the charging current of said branch so as to modify the triggering instants of said component, said device further comprising a control circuit furnishing two d.c. control signals whose magnitudes are a function of the intensities of the two half-cycles of the current flowing in said component and said shunt circuit comprises two transistors of opposed conductivity types which are connected with a common emitter, the collector-emitter circuits of said transistors being connected in parallel to said capacitive branch whereas the bases of said transistors are subjected to said control signals.

Further features of the invention will be apparent from the ensuing description.

In the accompanying drawings given solely by way of example:

FIGS. 5 and 6 are graphs, as a function of time, of the base voltage of one of the transistors employed in this device and of the current flowing in a triac of the device;

FIG. 7 is a graph of the voltage of the phase-shifting capacitor of the triac as a function of time, the scale of the times being distinctly enlarged with respect to FIGS. 4 and 5, and FIG. 8 is a graph to the same scale as FIG. 7 and showing the base voltage of FIG. 5.

Figure 1:
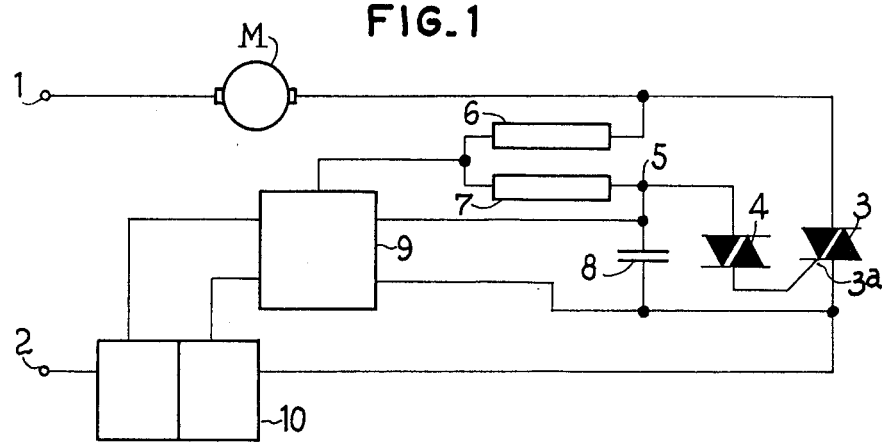
FIG. 1 is a simplified diagram of the current limiting device according to the invention.
Figure 2:
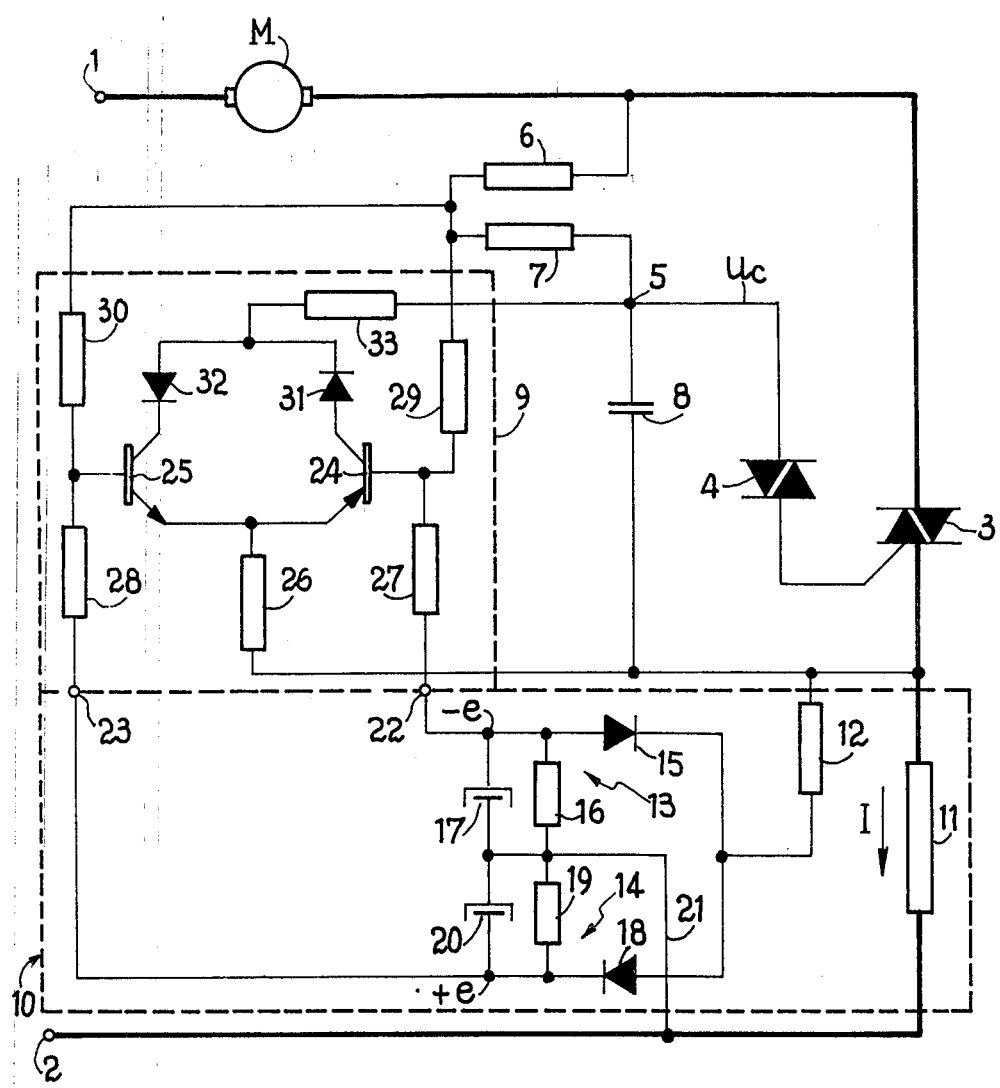
FIG. 2 is a detailed diagram of said device.

In the embodiment shown in FIGS. 1 and 2, the limiting device according to the invention limits the current in a motor M which is supplied with current by a single-phase a.c. current source, for example the mains, connected to terminals 1 and 2. In the known manner, the motor M is connected to the terminals 1 and 2 in series with a triggerable semi-conductor component of the bidirectional type or silicon controlled rectifier, namely, in the illustrated case, a triac 3 whose control electrode $3^a$ is connected to a diac 4 which is connected to the intermediate terminal 5 of an RC phase-shifting circuit comprising two resistors 6 and 7 and a capacitor 8 in series. This RC circuit is connected to the terminals of the triac 3.

The limiting device further comprises a current shunt circuit 9 capable of acting on the charging current of the capacitor 8 and thereby modifying in each half-cycle the triggering instant of the triac 3 as a function of a parameter which is generated in a control circuit 10 and is an image of the current flowing in the main circuit of the motor M and triac 3.

In FIG. 2, it is seen that the control circuit 10 comprises a resistor 11 connected in the main circuit of the motor M and triac 3. The voltage at the terminals of this resistor is directly proportional to the current flowing in the main circuit. Of course, the image of the current could be obtained by another series component such as, for example, a transformer.

The junction between the resistor 11 and the triac 3 is connected to a resistor 12 which is connected to two networks 13, 14 for detecting the two half-cycles of the signal at the terminals of the resistor 11. The detection network 13 comprises a diode 15 whose cathode is connected to the resistor 12 and whose anode is connected to the junction between a resistor 16 and a capacitor 17. Likewise, the network 14 comprises a diode 18 which is connected to the resistor 12 and to a resistor 19 and a capacitor 10. A conductor 21 constitutes the negative pole of this detection circuit and is connected to the terminal 2. By means of this circuit, there appear at the terminals 22 and 23 which constitute the output, two +ve and −ve voltages which are respectively images of the positive and negative currents I flowing in the resistor 11. The resistor 12 determines the time constant of the charging of the capacitors 17 and 20 and the resistors 16 and 19 determine the time constants of the discharging.

The current shunt circuit 9 comprises two transistors 24 and 25 of opposed conductivity types which are connected with a common emitter.

The emitters of these transistors are all connected to a resistor 26 which is connected to the point of junction of the triac 3 and the resistor 11. The resistor 26 has a double function, namely it permits compensating for possible deviations of the parameters of the transistors 24 and 25 and it permits limiting the gain of these transistors so as to damp their switching action and thereby avoid an excessively abrupt operation of the device. The base of the transistor 24 is connected through a resistor 27 to the terminal 22 of the control circuit 10 and the base of the transistor 25 is connected to the terminal 23 of the same circuit through a resistor 28. These bases are also connected through resistors 29 and 30 respectively to the point of junction between the resistors 6 and 7 of the RC circuit 6, 7, 8.

The collectors of the transistors are respectively connected through protection diodes 31 and 32 connected in opposed relation to a common collector resistor 33 which is connected to the junction point 5 of the RC circuit 6, 7, 8.

The operation is as follows (FIGS. 4 to 8):

While the current in the motor has a value lower than a threshold value considered as the limit not to be exceeded, the values of the +ve and −ve voltages furnished by the control circuit 10 are too weak to cause the conduction of the transistors 24 and 25. Under these conditions, the maximum voltage at the triggering capacitor 8 is solely determined by the resistors 6 and 7 (one of which is preferably adjustable to permit speed regulation). However, when the intensity of the current flowing through the motor and the resistor 11 reaches a sufficient value, the diodes 15 and 18 each start to conduct the respective half-cycle of the voltage produced at the terminals of this resistor 11. The capacitors 17 and 20 are charged at the rhythm of the periods of this voltage. If the intensity of the current in the charge is such that the +ve and −ve voltages are sufficiently high, the threshold of conduction of the transistors 24 and 25 is reached, the −ve and +ve voltages being applied to their respective base through the resistors 27 and 28.

FIG. 5 shows for a single half-cycle the base voltage of the corresponding transistor 24 or 25, the other half-cycle giving the same base voltage curve for the other transistor. The conduction threshold is indicated by the line $s$. Therefore, when the peak value of the base voltage (or the maximum value of the +ve or −ve voltage) exceeds the conduction threshold of the corresponding transistor, the latter starts to shunt the current by taking off a certain quantity of the charge current of the capacitor 8.

FIGS. 7 and 8 are drawn to an enlarged time scale and represent respectively for a single half-cycle (for example the first half-cycle of FIG. 5), the shape of the charge voltage $U_c$ of the capacitor 8 and of the +ve or −ve voltage. During the conduction period $t_1$ of the concerned transistor, the charge curve of the capacitor 8 is inclined and the trigger voltage is not reached during a period $t_2$ (in the case where there would be no conduction) but during a period $t_3$ which is longer than the period $t_2$. There is in fact a delay of the instant of triggering the triac 3 which coincides with the end of the period $t_3$.

Assuming that during a half-cycle the load on the motor does not decrease, the peak value of the current I increases and compensates for the reduction of the passage time $t_4$ (FIG. 6) of the triac 3. Consequently (FIG. 8), there is an increase in the absolute value of the +ve and −ve voltages and, as the thresholds of the diodes 15 and 18 are more distinctly exceeded, the shunting of the charge current of the capacitor 8 starts sooner in the half-cycle and is more energetic. But it also lasts longer ($t_1'$, $t_1''$), since the charge of the capacitor 8 lasts longer.

It will be understood that from half-cycle to half-cycle the phenomenon is cumulative and tends rapidly towards a state of equilibrium which depends in particular on the judicious choice of the charging and discharging parameters of the capacitors 17 and 20. The result is the current/speed of rotation curve shown in FIG. 4. It can be seen that, beyond a certain intensity $I_m$ of the current I there is obtained the break-off (the rotor no longer follows the rotating field of the stator) and the rapid blocking of the motor which corresponds to the stoppage of the motor when the load exceeds a given value. However, the motor is stopped during a flow of a limited current $I_c$ in the motor, this current having a value which is distinctly lower than the value of the threshold current $I_m$.

When the overload of the motor ceases, the motor rapidly resumes its no-load speed $N_o$ and can thus be rapidly and energetically cooled. The motor can be almost immediately once more put under load.

The limiting device may also act when starting up the motor, since its action is extremely rapid (a few half-cycles). It can therefore operate as a starting device for limiting mechanical shocks and reduce the current demands on the supply source.

Figure 3:
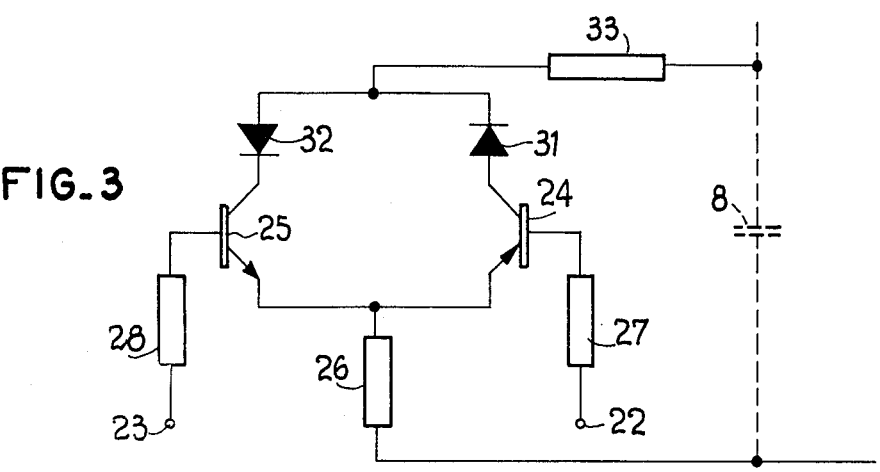
FIG. 3 is a partial diagram of the device in accordance with a modification.
Figure 4:
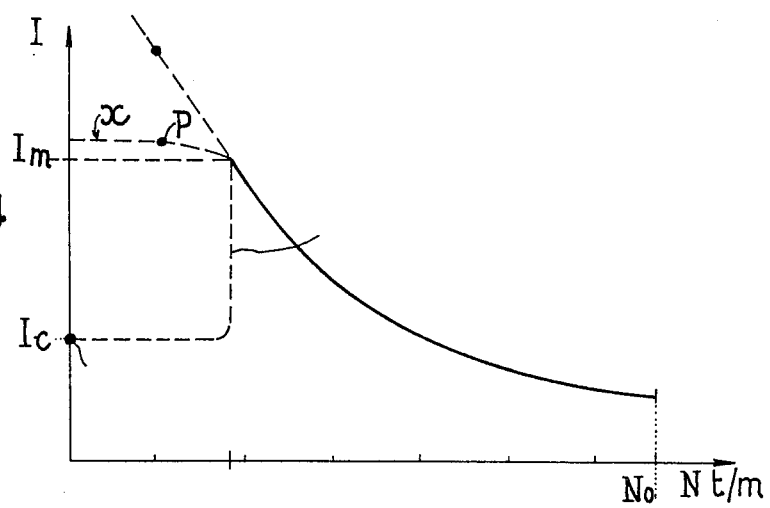
FIG. 4 is a graph of the current induced as a function of the speed of rotation of a universal motor with which the device according to the invention is associated.

FIG. 3 shows a modification of the limiting device in which the bases of the transistors 24 and 25 are connected solely to the respective outputs 22 and 23 of the control circuit 10. Consequently, they only receive the +ve and −ve voltages and not a fraction of the voltage which is established at the terminals of the RC circuit 6, 7, 8 and which, in the case of FIG. 2, is superimposed on the +ve or −ve voltage. The shape of the intensity/speed curve is then that of the section $x$ of FIG. 4. Thus it can be seen that the value of the current after operation of the threshold is distinctly higher than in the case of FIG. 2. For certain chosen values of the components, it is even possible to operate the motor at a precise point of operation P which permits avoiding the blocking of the motor. However, if the blocking is not inconvenient, it is preferable to employ the embodiment shown in FIG. 2 which produces with certainty a blocking of the motor with a low intensity of the current, the blocking being an indication to the user that the motor is overloaded. The reduction in the intensity of the current upon overloading is obtained above all by the superimposition on the +ve and −ve voltages of a fraction of the voltage at the terminals of the RC circuit, which permits triggering the transistors 24 and 25 sooner in each respective half-cycle. In fact, this amounts to accelerating the procedure for stopping the motor which thus stops within only a few half-cycles when there is an overload.

Having now described my invention what I claim as new and desire to secure by Letters Patent is:

1. A device for limiting the current in an a.c. motor having a commutator and for connection to a single-phase a.c. current source, the device comprising an RC phase-shifting circuit, a triggerable silicon-controlled rectifier component connected in series with said motor and in parallel with the RC phase-shifting circuit which is for furnishing the control voltage of said rectifier component, said RC circuit having a capacitive branch, a shunt circuit which is connected in parallel with said RC circuit and shunts a certain quantity of the charging current of said branch for modifying the trigger instants of said component, said shunt circuit comprising two transistors of opposed conductivity types and each comprising a base, an emitter and a collector and connected with a common emitter configuration, said transistors having collector-emitter circuits connected in parallel with said capacitive branch, said limiting device further comprising a control circuit furnishing two d.c. control signals whose magnitudes are a function of the intensities of the two half-cycles of the current flowing in said rectifier component, the bases of said transistors being connected to be respectively subjected to said control signals so that said shunt circuit can shunt, beyond a predetermined current threshold of the current in the motor, a notable part of the two half-cycles of each period of the current.

2. A device as claimed in claim 1, wherein a single resistor which is connected to one of the terminals of said rectifier component is connected to the emitters of said transistors.

3. A device as claimed in claim 1, wherein the RC circuit has an intermediate point and the bases of said transistors are further connected to the intermediate point, a resistor being interposed between said intermediate point and said bases.

4. A device as claimed in claim 1, wherein said control circuit comprises an element furnishing a measuring voltage which is a function of the current flowing in said rectifier component and a double rectifying and smoothing circuit for respectively rectifying each half-cycle of said measuring voltage, the rectifying and smoothing parts of said rectifying circuit having outputs respectively connected to the bases of said transistors.

5. A device as claimed in claim 1, wherein diodes for protecting said transistors are inserted in the collector-emitter circuit of said transistors.

* * * * *